United States Patent [19]
Regensburger

[11] Patent Number: 5,232,322
[45] Date of Patent: Aug. 3, 1993

[54] FASTENER

[75] Inventor: Werner Regensburger, Rebstein, Switzerland

[73] Assignee: Vereinigte Drahtwerke A.G., Biel, Switzerland

[21] Appl. No.: 719,023

[22] Filed: Jun. 21, 1991

[30] Foreign Application Priority Data

Jun. 25, 1990 [CH] Switzerland .................... 2104/90

[51] Int. Cl.$^5$ ............................................. F16B 13/04
[52] U.S. Cl. ...................................... 411/33; 411/353; 411/387; 411/510
[58] Field of Search ............... 411/337, 29, 32, 33, 411/353, 352, 354, 517, 44, 57, 72, 75, 78, 79, 81, 83, 360, 385, 383, 999, 508, 511, 387, 510

[56] References Cited

U.S. PATENT DOCUMENTS

| | | | |
|---|---|---|---|
| 1,572,770 | 2/1926 | Colley | 411/353 |
| 3,503,431 | 3/1970 | Villo et al. | 411/353 |
| 4,129,921 | 12/1978 | Greene | 411/353 X |
| 4,131,376 | 12/1978 | Busse | 411/354 X |
| 4,287,807 | 9/1981 | Pacharis et al. | 411/517 X |
| 4,391,544 | 7/1983 | Cadwallader | 411/352 X |

FOREIGN PATENT DOCUMENTS

| | | | |
|---|---|---|---|
| 2358479 | 6/1975 | Fed. Rep. of Germany | 411/517 |
| 1259692 | 3/1961 | France | 411/517 |
| 2359309 | 2/1978 | France | 411/337 |
| 647465 | 2/1979 | U.S.S.R. | 411/352 |
| 2102057 | 1/1983 | United Kingdom | 411/352 |

*Primary Examiner*—Rodney M. Lindsey
*Attorney, Agent, or Firm*—Ladas & Parry

[57] ABSTRACT

A plurality of anchoring members are threaded onto the shaft of the fastener. These anchoring members include an annular body and a spacer. The anchoring members are held between an abutment of the shaft and a locking section thereof fixed against an axial displacement thereon. The anchoring members are present as structural members which are separate from the shaft and are merely threaded onto the shaft. It is accordingly possible to use a large number of variously designed anchoring members together with only one shape of the shaft, which reduces considerably the costs of the production and increases the universality of the fastener. Specifically the shaft and the anchoring members may be made of a metal such that the fastener can display in comparison with plastic fasteners a much higher rigidity.

29 Claims, 6 Drawing Sheets

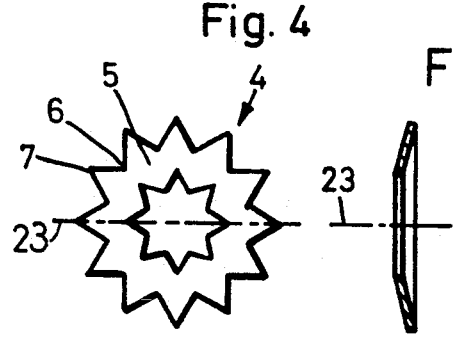
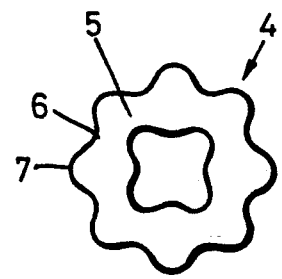
Fig. 4   Fig. 4A   Fig. 5
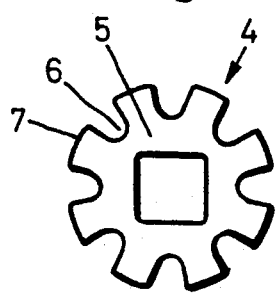
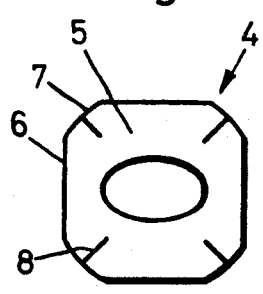
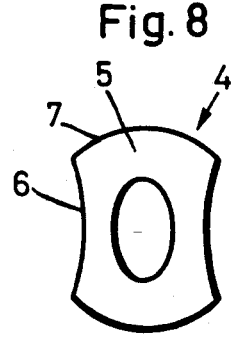
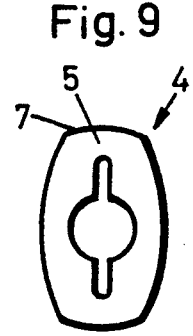
Fig. 6   Fig. 7   Fig. 8   Fig. 9
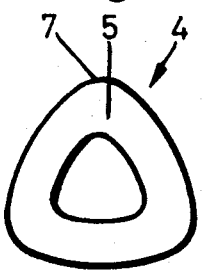
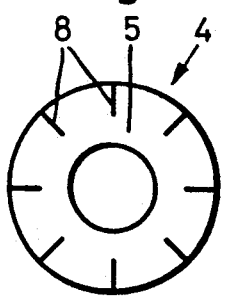
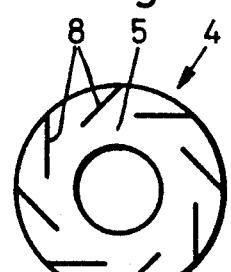
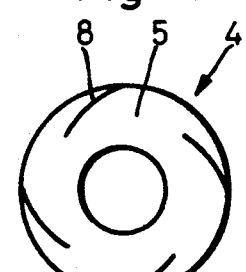
Fig. 10   Fig. 11   Fig. 12   Fig. 13
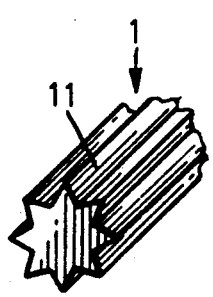
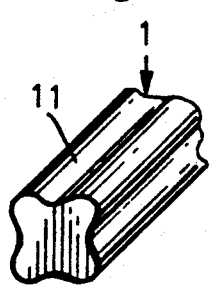
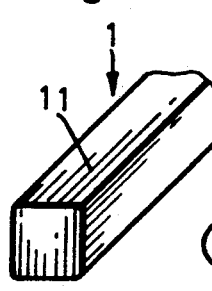
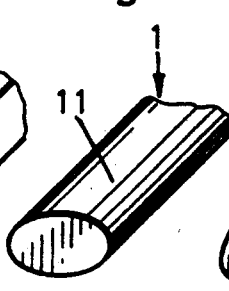
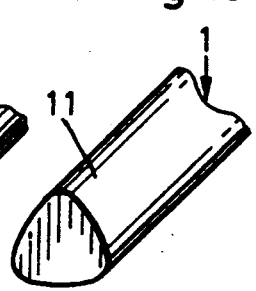
Fig. 14   Fig. 15   Fig. 16   Fig. 17   Fig. 18

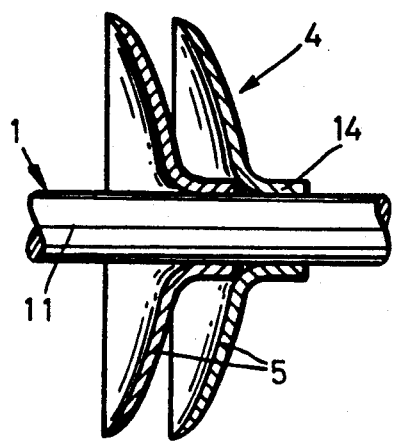
Fig. 19
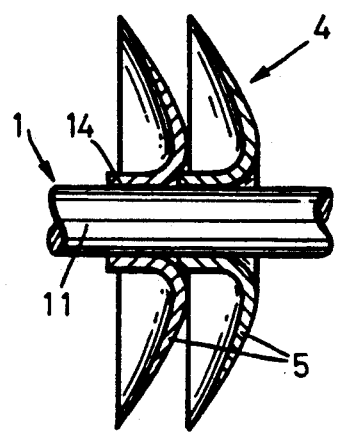
Fig. 20
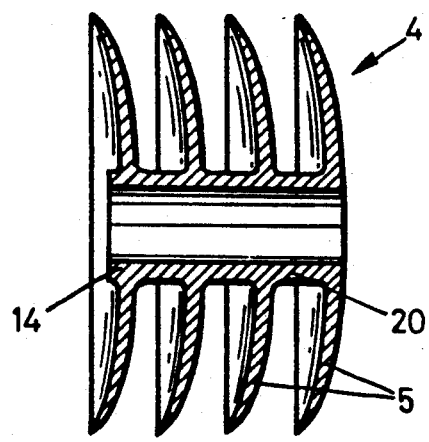
Fig. 21
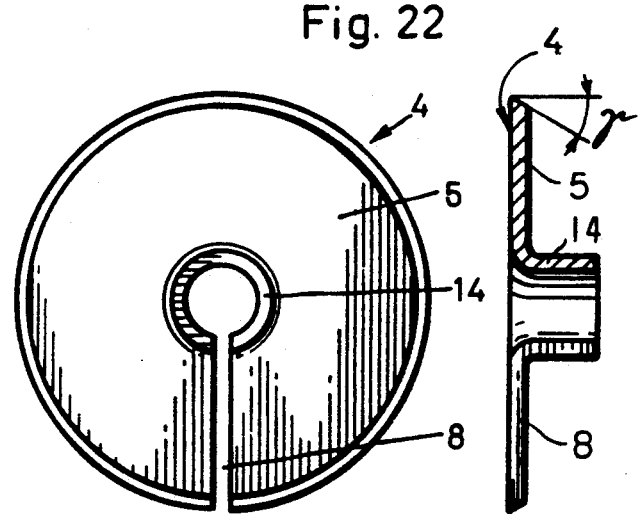
Fig. 22
Fig. 22A Fig. 23
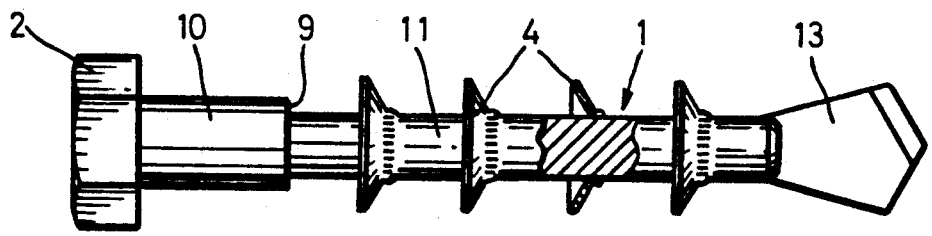
Fig. 24
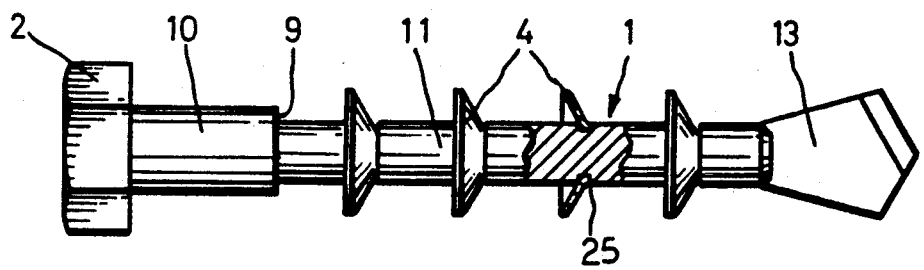
Fig. 25
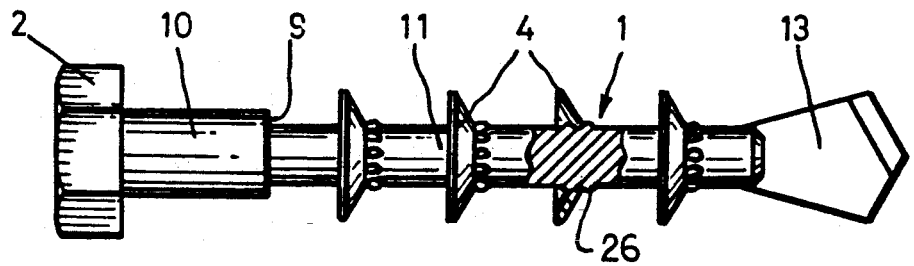
Fig. 26
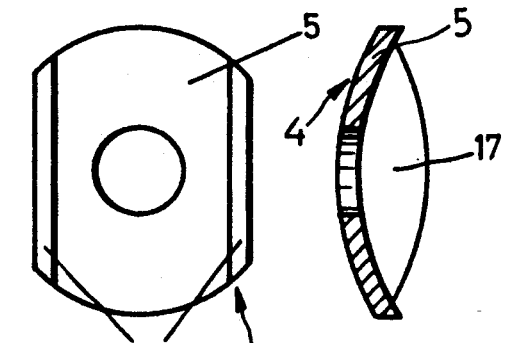
Fig. 26A
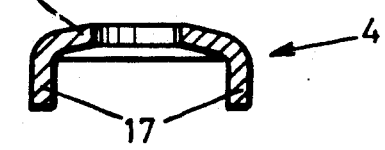
Fig. 26B

FASTENER

BACKGROUND OF THE INVENTION

1. Field of the Invention

The present invention relates to a fastener, having a shaft, which shaft includes a head end and a foot end and at least one anchoring member encircling the shaft and adapted for an anchoring of the fastener in an opening present in a structure.

2. Description of the Prior Art

Such fasteners are generally integrally made or molded, respectively, products of a plastic material. The shape and design of such fasteners changes, depending upon a prevailing application thereof and depends also on the material of the structure into which such a fastner is to be inserted. The result thereof is that in order to produce the accordingly large number of varying fasteners a large number of varying tools, e.g. injection molds, is necessary, which quite obviously renders the production of an individual fastener to be expensive. The known fasteners feature also the drawback that their anchoring member and their shaft are made of the same material which correspondingly sets limits regarding the production, in that e.g. the shaft and the anchoring members must consist of one and the same material.

SUMMARY OF THE INVENTION

Hence, it is a general object of the invention to provide a fastener, in which the anchoring member includes at least annular body separate from the shaft and adapted to be arrested on the shaft against an axial displacing relative thereto by means of an arresting structure.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIGS. 4–13 illustrate various embodiments of an annular body;

FIGS. 14–18 illustrate various embodiments of a shaft;

FIGS. 19 and 20 illustrate further embodiments of an annular body which is made integrally with a spacer;

FIG. 21 illustrates an embodiment, in which a number of annular bodies are made integrally with one sleeve common to all annular bodies;

FIGS. 22, 22A illustrates a further embodiment of an anchoring member;

FIGS. 23–25 illustrate further embodiments of the connecting of anchoring members to the shaft;

FIGS. 26, 26A, 26B illustrates a further embodiment of an anchoring member;

DESCRIPTION OF THE PREFERRED EMBODIMENTS

Figure 1:
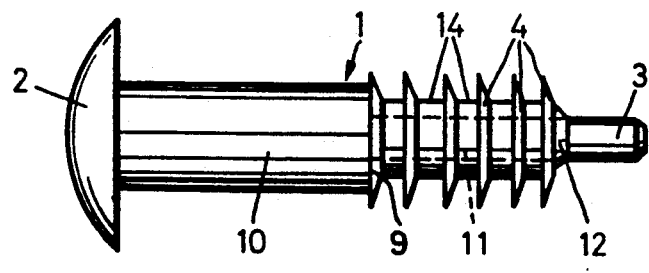
FIG. 1 is a side view of a fastener.

The fastener illustrated in FIG. 1 includes a shaft 1 having a head end 2, which head end 2 of this embodiment is designed in such a way that the fastener may be driven into an opening in a structure by means of hammer blows. The shaft 1 includes a first section 10 immediately adjacent its head end 2, which first section 10 has a smooth surface such as illustrated in FIG. 1 and which first section 10 is adjoined by a second section 11 illustrated in broken lines. Accordingly, a stop acting as an abutment 9 is present at the shaft 1 at a location between the first section 10 and the second section 11. The shaft 1 ends finally at a foot end 3. A number of disk shaped anchoring members 4 are threaded onto the second section 11 of the shaft 1, which anchoring members 4 will be described more in detail further below. The anchoring members 4 are held in respective distances by means of spacers 14, which spacers 14 are sleeve-like bodies which may either be individually threaded onto the shaft between the respective anchoring members 4 or may be designed integrally with a respective anchoring member 4. The reference number 12 identifies an exemplary upset area at the transition from the second section 11 of the shaft 1 to its foot end 3, by means of which upset an axial pressure is exerted onto the anchoring members 4 threaded onto the second section 11 of the shaft 1, such that these anchoring members 4 are arrested between the upset area acting as a locking section and the abutment 9 against an axial movement relative to the shaft 1.

The anchoring members 4 are of a spring elastically yielding nature such that when they are inserted into an opening in a given structure, they can bend somewhat inwards with regard to their circumference and may accordingly exert a force against the inner wall of such opening, which force obviously increases upon a pulling load directed in the pulling out direction of such fastener, such that a safe anchoring of the edge sections of the anchoring members 4 at and in the inner wall of a respective opening is secured. FIG. 1 illustrates further that the anchoring members 4 are dish-shaped. If, therefore, a pulling force acting in the pulling out direction of the fastener acts thereupon, the anchoring members 4 tend to straighten up somewhat, such that conclusively the pressure exerted by these anchoring members 4 onto the second section 11 of the shaft 1 increases or a pressure is generated, wherewith a clamping action is produced between the anchoring members 4 and the second section 11, which cooperating with the upset 12, i.e. with the locking section on the second section 11 of the shaft 1, prevents a relative movement between the anchoring members 4 and the shaft 1 such that the fastener is rigidly anchored in a respective opening, into which it has been driven.

Figure 2:
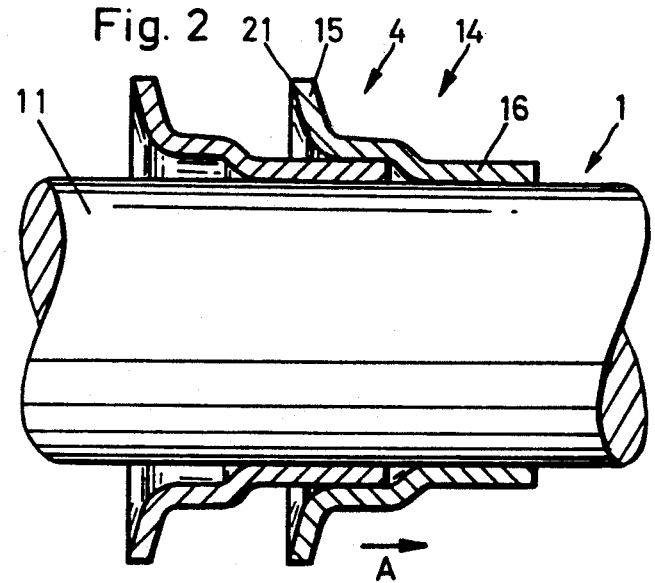
FIG. 2 illustrates a fastener having anchoring members which are nested into each other.

FIG. 2 illustrates an embodiment of anchoring members 4, which embodiment includes a disk or dish, respectively, like designed annular body 5, which is made integrally with a respective spacer 14. The fastener which is equipped with such anchoring members 4 is driven in the direction identified by the arrow A into a respective opening. The fastener is thereby locked against a pulling out of the opening, in that the edge area 21 of the respective anch;oring members 4 acts onto the inner surface or inner wall, respectively, of such opening. This edge area 21 may be of a large variety of designs, it can be sharpened and also include further provisions, which support a penetrating into the material of the structure in which the opening is present and thus supports the anchoring in this opening. The annular body 5 is made integrally with a spacer 14, which includes in turn a first section 15 and a second section 16. The inner diameter of the first section 15 of the spacer 14 has an extent relative to the outer diameter of the second section 16 that a respective second section 16 may be inserted nestingly in a respective first section 15, whereby at the finally produced fastener a number of such anchoring members 4 are threaded onto the second section 11 of the shaft 1 in a nested manner. The anchoring member 4 located at the outermost left side of the respective group of anchoring members 4 of the fastener abuts the abutment 9 (see FIG. 1), and the opposite anchoring member 4 located at the right end of the group of anchoring members 4 abuts via the second section 16 of the spacer 14 the respective locking section 12.

Depending now on a given application a corresponding number of anchoring members 4 can be threaded onto a shaft 1 and it is now obviously also possible to have the shaft 1 made of a certain material, but to select for the anchoring members 4, dependent from a material into which such fastener is to be inserted independently from the material of the shaft 1, a different material. For instance, the demands made on the anchoring members 4 in case of a soft material such as wood are quite different than in case of a brick, in case of a concrete structure etc. An example which can be given is that in the construction industry the shaft is required to be of a stainless material, therefore e.g. of a stainless steel and that the anchoring members 4 are made of a material which suits the material of the structure, into which the fastener is to be set into, it may be made e.g. of spring steel, ceramics, a composite material or of plastic.

Figure 3:
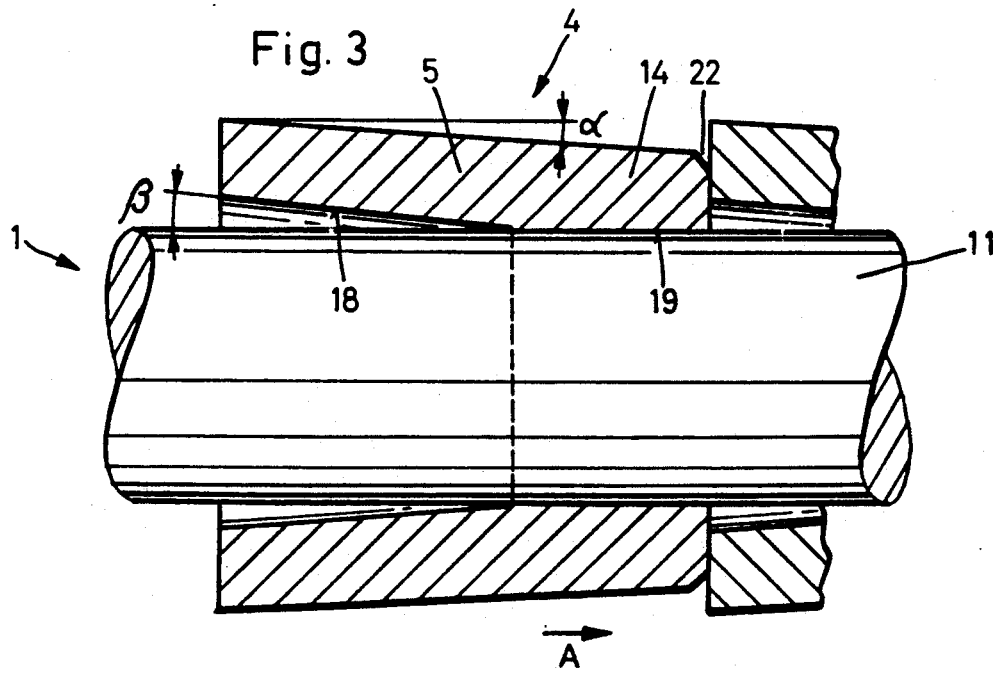
FIG. 3 illustrates an embodiment for use in structures having a high rigidity.

In case of very hard materials, into which such fastener is to be anchored, for instance reinforced concrete, the embodiment illustrated in FIG. 3 is specifically advantageous. The anchoring member 4 of this embodiment has the shape of a wedge-like sleeve, i.e. a plurality of such wedge-like sleeves are threaded onto the second section 11 of the shaft 1 of the fastener.

This anchoring member 4 has an outer jacket in the shape of a truncated cone. It includes, furthermore, at its inside an inner jacket section 18 having the shape of a truncated cone which is followed by an inner jacket section 19 having the shape of a cylinder. Accordingly, this anchoring member 4 is again composed of an annular body 5, which anchors itself along its edge in the respective opening, which annular body 5 is integrally followed by a spacer 14. The annular body 5 is illustrated in FIG. 3 as being of a massive design, it may, however, also have a structure as illustrated in the following FIGS. 4–13, such to allow during the inserting of the fastener into a respective opening an elastic yielding towards the shaft 1. Furthermore, the stiffness of this wedge-like sleeve may be selectively adjusted by a suitable selection of its material and also of its thickness. Such a fastener can be equipped with only one or two of such anchoring members 4 and fulfill its object completely satisfactorily.

In FIG. 3 the direction of insertion of the fastener is again illustrated by the arrow A. The spacer 14 includes a chamfer 22 at its face side facing into the direction in which it is to be driven in an opening, such to facilitate a driving of the fastener into e.g. a predrilled opening in concrete. At the illustrated embodiment the angle $\alpha$ between the outer jacket and a line parallel to the longitudinal axis of the fastener amounts to 3° and the angle $\beta$ between the inner jacket of the annular body 5 and the same line parallel to the longitudinal axis amounts to 5°. This secures upon a driving of the fastener into an opening in concrete the generation of a large radial force against the inner wall of the opening due to the elasticity of the anchoring member 4 such that a safe wedging of the fastener in the respective opening takes place.

It already has been mentioned, that the disk-shaped and the dish-shaped embodiment according to FIG. 2 and also for the cone or wedge, respectively, shaped embodiment of the annular body 5 according to FIG. 3 a large variety of cross-sectional shapes are foreseen, depending on a given application, e.g. material of the structure into which the fastener is to be set or driven into, or of the material of the annular body itself.

Examples of such cross-sectional shapes are illustrated in FIGS. 4–13, whereby it distinctly shall be noted that at a respectively illustrated disk the structures present at its circumference and the structures present at its central hole must not necessarily be present at the same time as illustrated in the drawings, i.e. the circumferential shape according to FIG. 4 can be present without any further ado with a circular center opening.

The annular body 5 of the anchoring member 4 illustrated in FIG. 4 comprises along its circumference recesses 6 or projections 7, respectively, such that a star-like circumferential shape is present. The sharp tips of the projections 7 facilitate obviously the penetrating into the inner wall of a respective opening. The center hole includes also projections or recesses, respectively, such that on the one hand depending on the selected material of the shaft 1 an increased clamping force transition from the annular body 5 onto the shaft 1 is achieved or on the other hand that it is guaranteed, that the anchoring member 4 sits on the shaft 1 in a fashion guided against a rotation thereto. The right hand side of FIG. 4 illustrates a section through the annular body 5 which in this embodiment is dish-shaped. It is to be noted hereto, that the inclined position of the annular body 5 relative to the longitudinal axis 23 is purely an exemplary position. A large variety of angular positions are foreseen, including a planar embodiment, according to which the disk extends perpendicularly relative to mentioned axis 23. It is, furthermore, to be noted that in this drawing only the annular body 5 and no spacer is designed. It is not necessary that the respective spacer is made integrally with the anchoring member 4. The anchoring members 4 may be as such purely of a disk-like shape, whereby the respective spacers have the shape of sleeves and are threaded as separate structures between two respective annular bodies 5 onto the shaft 1, whereby by means of the earlier mentioned axial clamping action a rigid composition is arrived at.

FIG. 5 illustrates an embodiment, according to which again recesses 6 and projections 7, respectively, are present along the circumference and where the center hole has a similar shape of its inner circumference.

The embodiment according to FIG. 6 is also a design having recesses 6 and projections 7, but here the center hole is roughly of a square shape.

The embodiment of FIG. 7 has a circumferential shape, which includes rectilinear edge sections having projections 7 of an obtuse angle. Additionally, slots 8 are visible, which simplify the elastically yielding bending of the annular body 5 during the insertion into an opening. The edges of such slots must not necessarily contact each other, the slot may open in radial direction towards the outside in form of a V with an acute angle, such to allow more easily the elastically yielding bending during the insertion in a respective hole or respective opening, respectively. In this embodiment illustrated in FIG. 7 the center hole is of a noncircular shape.

The embodiment of FIG. 8 includes basically only two projections 7, such that an anchoring takes place at two diametrically opposite sections of the circumference of the annular body 5.

FIG. 9 illustrates an embodiment of the annular body 5 which has a narrow cross section and, furthermore, a further example of the shape of the center hole. Still a further embodiment having a triangular shape with curvilinear extending side walls is illustrated in FIG. 10.

The embodiment according to FIG. 11 includes slots 8 extending in radial direction which again simplify the elastic bending during the insertion of the fastener into an opening. The slots 8 of the embodiment according to FIG. 12 extend tangentially relative to the longitudinal center line of the annular body 5, and the slots 8 of the embodiment of FIG. 13 extend curvilinearly. The design of the slots 8 according to FIGS. 12 and 13 may be specifically advantageous if the fastener is driven into a respective opening at a rotating movement, during which the sections of the annular body located between the respective slots 8 warp somewhat in a propeller like fashion. This embodiment may be, for instance, in such a case advantageous if the fastener such as will be described further below is designed as self-drilling fastener.

FIGS. 14–18 illustrate various cross-sectional shapes of the shaft 1 and specifically of the second section 11 of the shaft 1, onto which second section 11 the respective annular bodies 5 or anchoring members 4, respectively, are threaded. The illustrated cross-sectional shapes correspond to the shapes of the respective center holes of the above mentioned embodiments of the cross-sectional shapes of the annular bodies 5.

FIG. 19 illustrates anchoring members 4, in which the annular body 5 is formed integrally with the spacer 14 e.g. as a simple punched product. These anchoring members 4 are again threaded onto the second section 11 of the shaft 1. To be noted in this embodiment is the curved extent of the illustrated section of the annular body 5, which decreases to a sharp edge at the circumference. FIG. 20 illustrates an embodiment, in which the cross section of the annular body 5 of the anchoring members 4 extends curvilinearly and is again formed integrally with the respective spacer 14. Also this embodiment includes a sharp edge along its circumference.

The embodiment according to FIG. 21 has a plurality of annular bodies 5 made integrally with a sleeve 24. Such an embodiment can be selected, for instance, when the material of the anchoring members 4 lends itself to an injection molding. The spacer 14 of the embodiment according to FIG. 21 is formed by a projection at the here left end of the sleeve 24.

FIG. 22 illustrates an anchoring member 4, in which the annular body 5 is formed integrally with the spacer 14 and which includes at one location a slot 8 extending in radial direction and completely from the spacer 14 to the edge. The circumferential edge of the annular body 5 is sharpened such as illustrated by the angle γ. It is obvious that at all embodiments the circumferential edge of the respective annular bodies 5 can, depending on the prevailing application, not only be variously structured (FIGS. 4–10), but also can be sharpened to be respective various extent.

FIG. 23 illustrates specifically a fastener which is equipped with a drill bit 13, illustrates therefore a self-drilling fastener. The head end of the shaft 1 has the shape of a nut such to be acted upon or operated, respectively, by a corresponding tool. The first section 10 and the second section 11 of the shaft 1 which, as mentioned earlier, have different diameters such that a shoulder is present acting as abutment 9, which can clearly be seen in this figure. It must be clearly noted, that the illustration is intended merely for a clear illustration of the various described sections of the shaft 1, which, however, must not be absolutely present at the designed arrangement of the anchoring members 4. In the embodiment according to FIG. 3 the anchoring members 4 are not held by an axial clamping but rather by a welding, soldering, brazing or a bonding to the shaft 1 in an integral manner. FIG. 24 illustrates an embodiment, in which the anchoring members 4 are anchored in annular grooves or notches 25, respectively, in the shaft 1. Also this exemplary embodiment illustrates the fastener as self-drilling fastener having a drill bit 13 and again the first 10 and second section 11 of the shaft 1, which sections have varying diameters. FIG. 25 illustrates an embodiment, in which the anchoring members 4 are form locked to the shaft 1 by means of burled or upset, respectively, areas 26.

FIG. 26 illustrates a further embodiment of an anchoring member 4. In this embodiment the edge areas 17 of the annular body 5 are designed in an angular manner, such that these areas 17 act as spacers, in that they abut at their edge onto the respective axially adjacent anchoring member 4 such to set their mutual distance.

Figure 27:
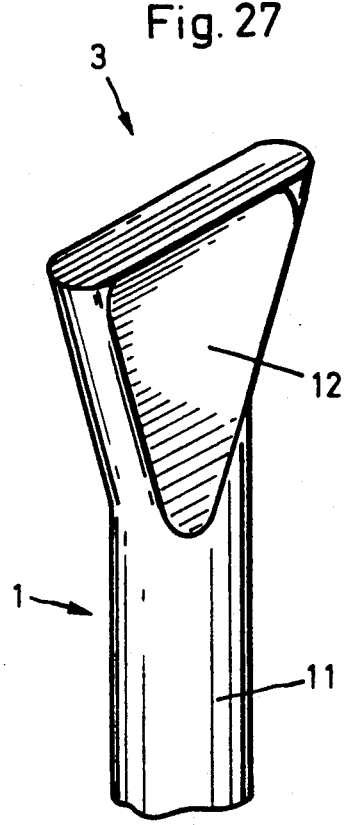
FIGS. 27–29 are illustrations of embodiments of the foot end of a shaft having wedge-shaped designs.
Figure 28:
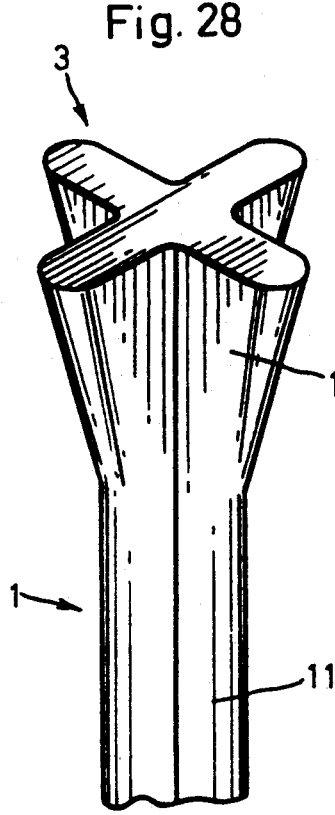
Figure 29:
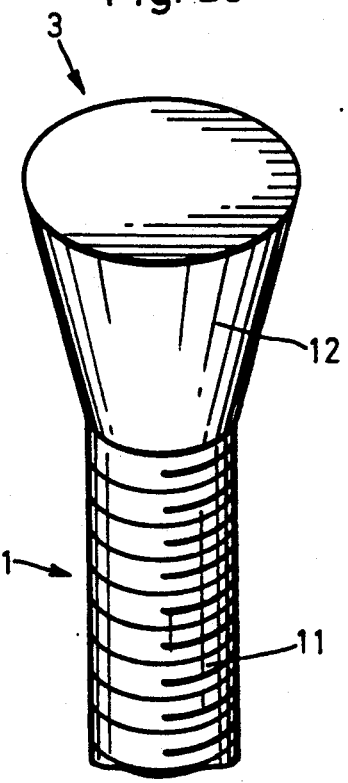

FIG. 27 illustrates a foot end 3 of a shaft 1, specifically of its second section 11. This foot end section 3 has been pressed together and deformed to a wedge or cone shaped state, such to form a locking section 12. If a pulling-out force acts onto the fastener, this locking section 12 exerts onto the immediately adjacent anchoring member 4 or anchoring members 4 an expanding force, accordingly a force acting in the radial direction of the annular body 5, wherewith the anchoring in the wall of the respective hole or respective opening, into which the fastener has been set, is increased. FIG. 28 illustrates a further possible embodiment of the foot end 3 of the shaft 1, which foot end 3 is also of a wedge like shape. The increase of the cross section at the foot end 3 is produced after the anchoring members 4 have been threaded onto the shaft by a plastic deformation, such that at the same time a locking of the anchoring members 4 onto the shaft 1 and possibly the clamping against the abutment 9 is produced. In the embodiment according to FIG. 29 the part adjoining the locking section 12 is designed as threaded pin such that it can be threaded into the end of the shaft.

Figure 30:
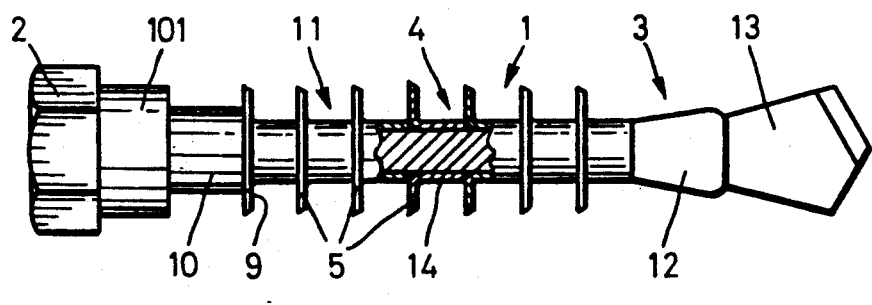
FIG. 30 illustrates a self-drilling fastener.

FIG. 30 illustrates an embodiment as self-drilling fastener. It includes a head end 2 shaped for a force transmitting cooperation with a tool, which head end 2 is followed by the first section 10 of the shaft 1, followed in turn by the abutment 9 and further by the second section 11 of the shaft 1. The anchoring members 4 with the annular bodies 5 and the spacers 14 located therebetween, which spacers 14 may be separate sleeves or sleeves designed integrally with the annular bodies 5 are threaded onto this second section 11. The foot end 3 of the shaft 1 is plastically deformed for the forming of the locking section 12, whereby the anchoring members 4 are clamped between this deformed area and the abutment 9. Furthermore, this locking section 12 is shaped similar to the illustration according to FIG. 27 in a wedge-like manner such that upon the presence of a pulling-out force acting according to the illustration of FIG. 30 towards the right hand side at least the annular body 5 which is immediately adjacent the locking section 12 is widened or broadened, respectively, in a radial direction thereof for an increasing of the anchoring. Thereafter, a drill bit 13 is adjacent the locking section 12. In comparison with the embodiments according to FIGS. 23-25 the anchoring members 4 are not held by an integral interconnection on the shaft 1, but are rather held in a clamped manner.

The illustrated embodiment shows a further possible variant of the shaft 1, which is possible for all embodiments. The shaft 1 is designed with a third section 101 located between the first section 10 and the head end 2, which third section 101 has a larger diameter than the second section 10. The diameter of the third section 101 may correspond at least to the diameter of a predrilling for the fastener such that no radial clearance can occur at the area of the head end 2 of the fastener set into the opening or hole, respectively.

It is, hereto, to be noted that it is possible that only a very small clamping force can act such that upon the rotating movement of the shaft 1 for the drilling of the hole the anchoring members 4, i.e. at least the annular bodies 5, are stationary relative to the rotating shaft 1, i.e. they do not take part in the rotational movement such that the penetrating into the drill hole is correspondingly simplified because merely an elastic bending of the annular bodies 5 takes place, but no rotational movement thereof in the drilled hole.

Figure 31:
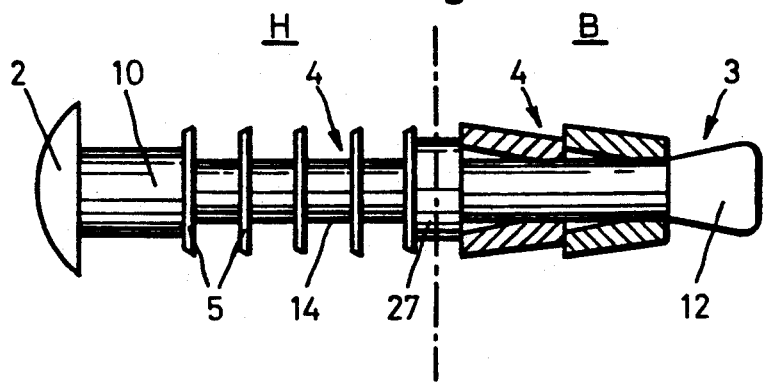
FIG. 31 illustrates a fastener suitable for connecting structures of differing materials.

FIG. 31 illustrates a further embodiment of the fastener, which, due to the fact that the anchoring members are structures which are separate from the shaft, contains two different kinds of anchoring members which additionally are arranged to act in opposite directions. This fastener can be, for instance, used to hold two bodies together, which consist of different materials. By example, in FIG. 31 a structure H made of wood is connected to a further structure B made of concrete. The foot end 3 of the fastener includes a locking section 12, which for instance has the same shape as the embodiments illustrated in FIGS. 27-29. Two anchoring members 4 designed in accordance with the embodiment of FIG. 3 are located adjacent this locking section 12, which members such as has been disclosed above are suitable for an anchoring in concrete. These anchoring members 4 are followed by a spacer 27 followed in turn by anchoring members 4 having annular bodies 5 and spacers 14 designed in accordance with any one of the above illustrated embodiments as disk or dish, respectively, like members. The anchoring member located at the outermost right hand side abuts the shoulder of the second section 10 of the shaft which has in comparison with the first section a somewhat larger diameter, which section 10 ends finally at the head end 2, which is designed such that the fastener can be driven into the respective opening by hammer blows. For instance, a blind hole can be drilled into the concrete and thereafter the fastener driven into this blind hole. In the structure made of wood a further blind hole can be made at a corresponding location (or at corresponding locations, respectively) and thereafter this wood structure can be pushed or pressed, respectively, onto the fastener projecting out of the concrete structure. By means of such design the fastener, e.g. when a concrete wall shall be clad by wooden panels, is not visible from the outside, such that the panel is not rendered unsightly by projecting fasteners. Obviously also here the fastener can be designed as self-drilling fastener including a drill bit 3 such that the fastener can be set into the concrete by one single operation and that merely a predrilling of holes into the wooden member is necessary.

Figure 32:
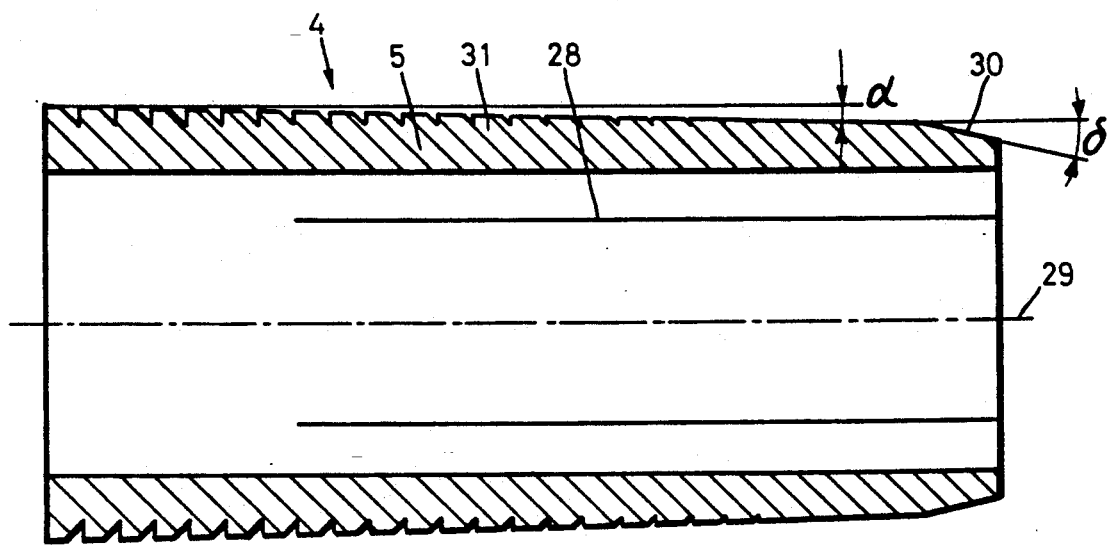
FIG. 32 is an illustration of a further embodiment.

A further embodiment of the anchoring member 4 is illustrated in FIG. 32. This anchoring member is again of a sleeve-like shape corresponding to the anchoring member of the embodiment according to FIG. 3. Also here, a respective fastener can be equipped with only one single or then with a plurality of such anchoring members.

The cross-sectional shape of the embodiment according to FIG. 32 can equal, for instance, any one of the earlier described cross-sectional shapes, such as described with reference to FIGS. 4-13. The illustrated shape of the outer jacket corresponds to the shape illustrated in FIG. 4, whereby it is obvious to be noted, that seen in the longitudinal direction a large number of such projections 5 according to FIG. 4 are present such that the outer jacket of the anchoring member 4 according to FIG. 33 is structured at least along a part of its longitudinal extent in a sawtooth like manner such as identified by reference numeral 31.

The central hole, i.e. the axial bore hole extending through this sleeve shaped anchoring member 4, has a smooth inner surface. Obviously it also can feature a cross-sectional shape in accordance with the earlier disclosed embodiments, whereby in all embodiments this cross-sectional shape corresponds advantageously to the cross-sectional shape of the shaft 11, such as illustrated in FIGS. 14-18 such that the anchoring member 4 sits onto its shaft 1 arrested against a rotation relative thereto. Specifically advantageous is a design in which the cross-sectional shape of the outer circumference of the anchoring member corresponds to the design of the central hole and accordingly to the design of the cross section of the shaft 11.

Analog to the chamfer 22 of the embodiment according to FIG. 3 the embodiment according to FIG. 32 includes an end section having an outer jacket section 30, which extends inclined relative to the longitudinal center axis of the shaft by an angle δ, whereby this angle δ is larger than the angle α, at which the outer jacket of the anchoring member 4 extends inclined relative to the longitudinal center axis 29.

In this embodiment, furthermore, two of e.g. three slots 28 are visible, which extend through the annular body 5. Quite obviously it is possible that only one slot or then a plurality of such slots 28 are foreseen.

While there are shown and described present preferred embodiments of the invention, it is to be distinctly understood that the invention is not limited thereto, but may be otherwise variously embodied and practiced within the scope of the following claims.

I claim:

1. A fastener for being driven into an opening in a structure, comprising a shaft having a head end and a foot end, at least one anchoring member encircling the shaft for anchoring the fastener in the opening in the structure when the fastener is driven into said opening by applying impact force onto said head end, said at least one anchoring member comprising at least one annular body separate from said shaft, said shaft including an arresting structure, said annular body being arrested on said shaft against axial displacement relative thereto by said arresting structure, so that when the fastener is driven into the opening, the anchoring member will be driven entirely into the opening by said arresting structure, said annular body having a circumferential edge and at least one slot in said annular body extending to said circumferential edge to provide an axial elastic deflection of said annular body when the fastener is driven into said opening in said structure and a tapered locking section at the foot end of the shaft, said tapered locking section abutting against said annular member to hold the same in clamped relation between said arresting structure and said foot end, said tapered locking section widening in a direction away from said shaft to generate a force, upon the presence of a force acting in a direction to remove the fastener from said opening, acting against the anchoring member abutting against said locking section to expand said anchoring member and increase the pressure thereof against the wall of said opening in said structure.

2. A fastener as claimed in claim 1, wherein said annular body has a conical outer surface.

3. A fastener as claimed in claim 2, wherein a plurality of said annular bodies are clamped between said arresting structure and said foot end in end to end abutting relation, each annular body forming a step with its adjacent abutting bodies.

4. A fastener as claimed in claim 3, wherein said annular bodies are arrayed with the conical outer surfaces thereof all tapering in the same direction.

5. The fastener of claim 1, in which said arresting structure includes a soldering, brazing, welding, cementing or a plastic deformation of said shaft.

6. The fastener of claim 1, in which said annular body has a surface with irregularities therein adapted to engage a wall surface of said opening in said structure, such that an areawise penetration and thus an increased pressure is produced against said wall surface.

7. The fastener of claim 1, in which at least one slot extends rectilinearly.

8. The fastener of claim 1, in which said shaft includes a first section having a first diameter and adjacent thereto in the direction of its foot end a second section having a second diameter, which second diameter is smaller than the first diameter, to provide an abutment for axially arresting said anchoring member, a plurality of said anchoring member being on said second section said locking section being located at the foot end of said shaft and terminating said second section for axially clamping said anchoring members against one another between said locking section and said abutment.

9. The fastener of claim 8, in which at least said second section of the shaft has a cross-sectional shape which is non circular.

10. The fastener of claim 1, in which said foot end of the shaft is in the form of a drill bit.

11. The fastener of claim 1, in which each annular body is equipped with a spacer for a setting of the axial distance between same and an adjacent annular body.

12. The fastener of claim 11, in which each spacer is integral with said annular body.

13. The fastener of claim 11, in which each spacer comprises a sleeve which is integral with said annular body.

14. The fastener of claim 1, in which said at least one annular body is of a disk like shape.

15. the fastener of claim 1, in which said at least one annular body is of a dish like shape.

16. The fastener of claim 11, in which the spacer has the shape of a sleeve and includes a first section having an inner diameter and adjoining the annular body and adjoined in turn by a second section having an outer diameter, which inner diameter of the first section is larger relative to the outer diameter of the second section, so that for a plurality of anchoring members threaded onto the shaft a respective second section of a respective sleeve like spacer projects in a nested manner into the first section of the sleeve like spacer of an adjacent anchoring member.

17. The fastener of claim 11, in which the spacer comprising a plurality of parts and at least one pair of edge areas extending from the anchoring member angled in the direction of the longitudinal axis of the shaft, which edge areas are adapted to act as a spacer contacting a respective adjacent anchoring member.

18. The fastener of claim 1, in which said anchoring member has the shape of a hollow cone seated on the shaft.

19. The fastener of claim 18, in which the anchoring member includes a first inner jacket section having the shape of a truncated cone and determining the axial extent of the annular body and followed by a second inner jacket section having the shape of a cylinder and determining the axial extent of the spacer.

20. The spacer of claim 1, in which each annular body has the shape of a disk and a plurality of annular bodies are made integrally with one sleeve member common to said plurality of annular bodies, which sleeve member includes a projection in the axial direction of the shaft and thus forming a spacer.

21. The fastener of claim 8, in which a third section of the shaft is located between the first section and the head end of the shaft, which third section has a diameter which is larger than the diameter of the first section, 22. The fastener of claim 1, in which said at least one anchoring member consists of a material which is different from the material of the shaft.

23. The fastener of claim 8, in which at least the second section of the shaft has a cross-sectional shape which deviates from a circular shape, and in which each anchoring member includes a central opening of a shape corresponding to the cross-sectional shape of the second section of the shaft, such that a respective anchoring member is held against rotation on the second section of the shaft.

24. The fastener of claim 8, in which each anchoring member has a central opening of a shape corresponding to its circumferential shape.

25. The fastener of claim 1, in which said anchoring member has the shape of a hollow cone seated onto said shaft and having an outer surface inclined at an angle relative to the longitudinal axis of the shaft.

26. The fastener of claim 25, in which the outer surface of the anchoring member includes at its end section which is the leading end when inserting the fastener into the opening in the structure an outer section extending at an angle relative to the longitudinal axis of the shaft which is larger than the angle of inclination of the outer surface relative to the longitudinal axis of the shaft.

27. The fastener of claim 25, in which the outer surface of the anchoring member includes a sawtooth like structure.

28. The fastener of claim 25, in which the slot in the anchoring member extends longitudinally at least along a portion of the axial extent of the anchoring member.

29. The fastener of claim 1, in which at least one slot extends curvilinearly.

* * * * *